Dec. 31, 1935. T. C. PEARSE ET AL 2,026,057
INDEPENDENT WHEEL SUSPENSION FOR VEHICLES
Original Filed April 3, 1933   2 Sheets-Sheet 1

INVENTORS,
Thomas C. Pearse and
BY Thomas H. Bowser,
Howard P. Smith.
Their ATTORNEY Dec. 31, 1935. T. C. PEARSE ET AL 2,026,057
INDEPENDENT WHEEL SUSPENSION FOR VEHICLES
Original Filed April 3, 1933   2 Sheets-Sheet 2

INVENTORS,
Thomas C. Pearse and
BY Thomas N. Bonser,
Norman S. Smith,
Their ATTORNEY Patented Dec. 31, 1935

2,026,057

UNITED STATES PATENT OFFICE 2,026,057

INDEPENDENT WHEEL SUSPENSION FOR VEHICLES

Thomas C. Pearse and Thomas H. Bonser, Dayton, Ohio, assignors of one-third to Charles M. Kelso, Dayton, Ohio Application April 3, 1933, Serial No. 664,049
Renewed June 7, 1935

6 Claims. (Cl. 267—20)

This invention relates to new and useful improvements in independent wheel suspensions for vehicles.

It is one of the principal objects of our invention to provide for vehicles a shock absorbing unit in which all action and reaction takes place in lines substantially parallel to the frame.

It is another object of the invention to provide an independent wheel suspension for vehicles, in which a wheel is mounted upon a stub axle attached to an arm that is free to move about a pivot solidly attached to the vehicle frame. The weight of the vehicle and the shocks incident to the movement of the wheel, are carried and absorbed by a compression or extension shock strut so placed that when an upward or downward movement of the wheel takes place, the total length of the shock strut will be changed or varied to absorb the shock.

It is another object of the invention to provide means for applying our shock-absorbing unit to the front wheels of a vehicle in such a manner that the king pin will not move up and down. Instead, the wheel mounting and shock-absorbing mechanism will rotate in a horizontal plane about a king pin which remains directly attached to an extension of the frame.

It is another object of our invention to provide compressible pads for taking up the shock in one form of embodiment of our shock-absorbing unit.

Another object of our invention is to include in the suspension and shock-absorbing units, when desired, a counter-balancing weight to soften the shocks to which the wheel is incident.

If the counterbalancing weight is flexibly secured to the wheel-carrying arm, the effect of the inertia, when such inertia effect exceeds the mass-times-gravity effect of the counterbalancing weight, is reduced when the wheel is subjected to a shock, for the weight, when not solidly connected to the arm, does not immediately follow the rotation of the arm when that shock occurs.

Figure 2:
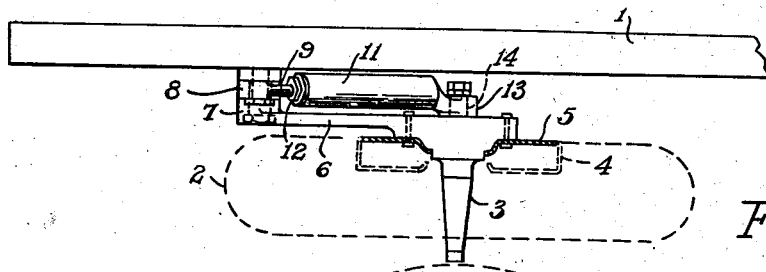
Figure 3:
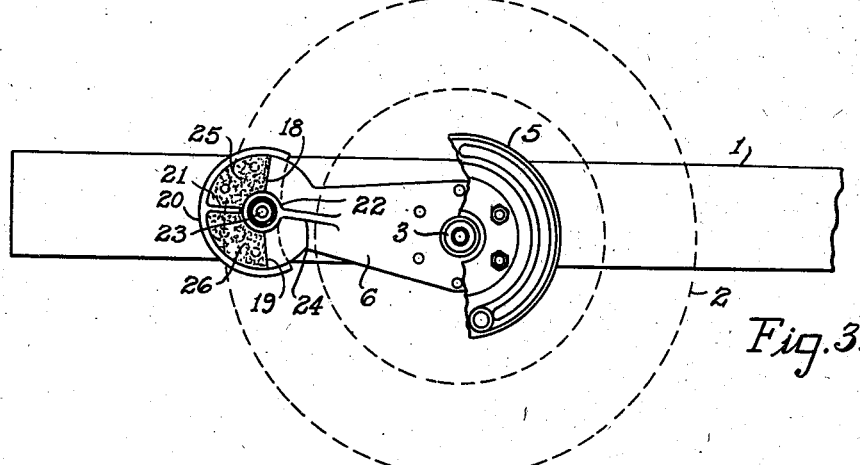
Figure 1:
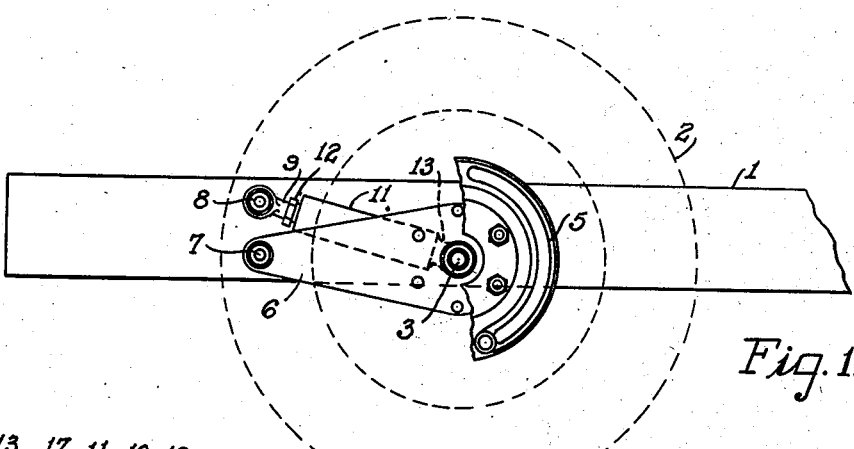
Figure 4:
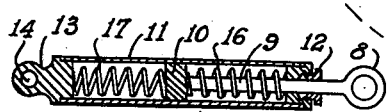
Figure 5:
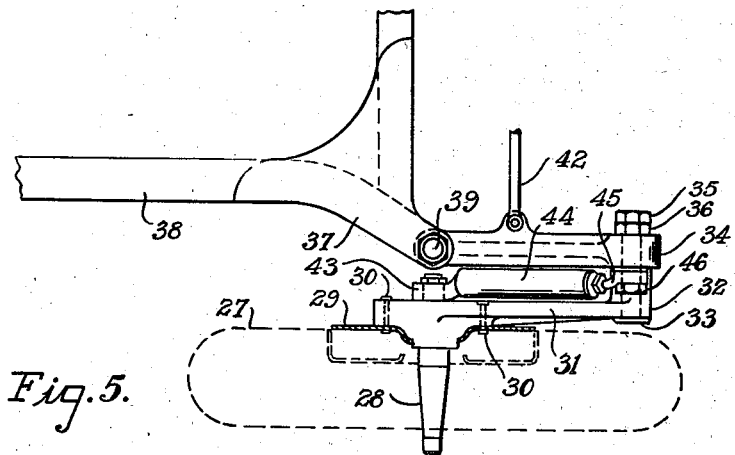
Figure 6:
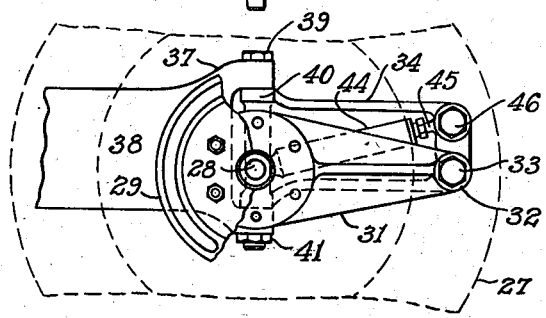
Figure 7:
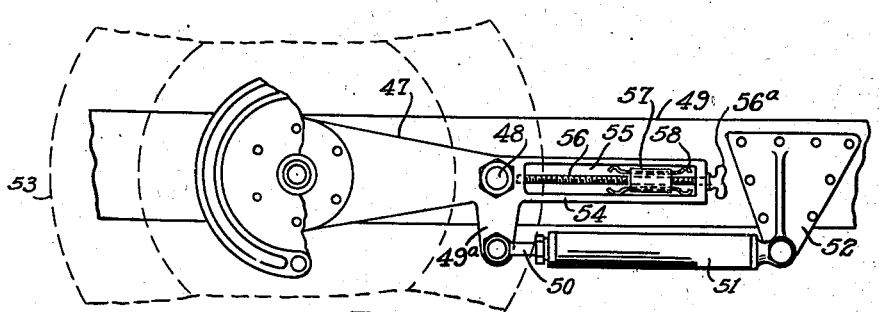

In the accompanying drawings Figure 1 is a side view of a rear vehicle wheel to which one form of embodiment of our improved shock-absorbing device is applied. Figure 2 is a top plan view of the same. Figure 3 is a side view of a rear vehicle wheel to which a resilient pad form of shock-absorbing device is applied. Figure 4 is a longitudinal sectional view taken through the shock strut employed in the shock absorbers illustrated in Figures 1 and 2. Figure 5 is a plan view of another form of embodiment of our shock absorber applied to a front vehicle wheel. Figure 6 is a plan view thereof. And Figure 7 is a side view of another form of embodiment of our shock absorber, showing a counterbalance weight therefor.

Referring to the accompanying drawings for a detailed description of our invention, the numeral 1 designates the frame of a vehicle such as an automobile, and the numeral 2 a wheel therefor. This wheel has a stub axle 3, a brake drum 4, and a brake backing plate 5, which is secured to the stub axle. Attached to this plate is the inner end of an arm 6 which is secured at its free end by an elongated pivot member 7 to the frame.

Also, pivotally attached to the frame a short distance above the pivot 7, or below the latter, if desired, is the outer ring end 8 of a plunger rod 9. At its inner end this rod is secured to a plunger 10 within the cylinder 11 of a shock strut, the latter being closed at its plunger end by a stuffing box 12 and at its opposite end by a head 13 formed with a hole 14 by which it is secured to the axle 3. Surrounding the rod 9 within the cylinder 11 is a coil spring 16, while between the cylinder head 13 and the plunger 10 a coil spring 17 is inserted. These springs absorb the shocks to which the wheel 2 is incident, through action and reaction in lines parallel or slightly oblique to the wheel frame. Although we have illustrated the form of shock strut just described, any other suitable type may be employed if desired.

In Figure 3 we have shown another form of embodiment of our invention. In this instance the arm 6 terminates at its outer end in a substantially half round portion with straight radial ends 18 and 19 respectively. Secured to the frame 1, below the outer end of the arm 6, by suitable fashioning elements, is a substantially three-quarters round, flanged plate 20 having a central radial projection 21. Provided on the outer end of the arm 6 is a boss 22 formed with an opening to receive a pivot 23 that is fixed in the frame 1. A bracing rib 24 projects from this boss to the middle portion of the arm.

Secured to the outer surface of the backing plate 20, one on each side of the projection 21, are two substantially triangular flexible pads 25 and 26 constructed of rubber, felt or other suitable material. When the wheel 2 is subjected to a road shock, it will be absorbed by the pad which is compressed by the radial edge of the arm 6 that is moved against it.

In Figures 5 and 6 we have shown a construction adapted to be applied to a front vehicle wheel in such a manner that the king pin will not move up and down. Instead, the wheel mounting and shock-absorbing mechanism will rotate in a horizontal plane about a king pin which remains directly attached to an extension of the frame.

In Figures 5 and 6 the numeral 27 designates a vehicle wheel having a stub axle 28 to which a brake backing plate 29 is secured. Attached by bolts 30 to the brake drum backing plate 29 is the inner end of an arm 31. The outer end of this arm terminates in an enlarged hollow boss portion 32 to receive a pivot stud 33 which passes through a hole in the outer end of an arm 34, which may be of I-section or any other suitable section. To the outer end of this stud, nuts 35 and 36 are applied. (See Figures 5 and 6).

The arm 34 is pivotally secured to a forwardly projecting portion 37 of the frame 38 by a king pin 39. The extension 37 of the frame 38 terminates in a forked part to receive the hub 40 of the arm 34. Through this hub 40 of the arm 34, and the forked ends of the frame portion 38, the king pin 39 projects in order to permit a free pivotal movement of the arm 34 to which the wheel-carrying arm 31 is pivotally secured. The king pin 39 is threaded at its lower end to receive a nut 41, and attached to the middle portion of the arm 34 is one end of a conventional tie rod 42. (See Figures 5 and 6).

The stub axle 28 projects beyond the inner end of the arm 31 through a hole formed in the head end 43 of a shock strut cylinder 44 similar to the cylinder 11. The outer end of the plunger 45 is secured to a stud 46 that is secured to the outer end of the arm 34 above or below the stud 33. (See Figure 6).

The shock strut 44 will therefore receive the shocks to which the wheel 27 is incident, while permitting said wheel a free horizontal swinging movement about the king pin 39, without the likelihood of it moving up and down. The operation of the shock absorber itself is the same as the shock absorber provided for the rear wheel in Figure 1, except that our king pin structure permits a free horizontal movement of the wheel secured to the arm 31.

In Figure 7 we have illustrated another form of embodiment of our shock-absorbing invention. Here the arm 47 secured to the vehicle wheel, is pivotally secured by a stud 48 to the frame 49. The arm 47 has a downwardly extending part 49ª to make it a bellcrank lever that is free to move about the stud 48. To the end 49ª of this bellcrank lever there is attached a plunger 50 which is operative in a shock strut structure 51 attached at its outer end to a triangular re-inforced plate 52 that is riveted, or otherwise suitably secured, to the frame 49. In this construction all action and re-action of the independently-supported wheel 53 will take place in lines parallel to the frame 49. In other words, since the frame is strongest in its lengthwise direction, the shock-absorbing action will be against the frame in the direction of its maximum strength to insure an extremely low unsprung weight, easier steering and much better road holding qualities. In conventional constructions the action and re-action are at right angles to the frame.

In the unit illustrated in Figure 7 we have shown means for counterbalancing the unsprung weight represented by the wheel, stub axle, braking mechanism and the end of the arm which carries the vehicle wheel, said means adapted to be applied to the constructions illustrated in the other figures for the same purpose, if desired. The arm 47 has an extension 54 formed with a longitudinal slot 55 through which a screw 56 passes lengthwise thereof. The inner end of this screw enters a tapped hole in the arm extension 54 at the inner end of the slot, and on its outer portion the screw is provided with a butterfly head 56ª for the convenient adjustment of it.

Mounted on the screw 56 within the slot 55, for a slidable movement longitudinally through the latter, is a counterbalance such as the cylindrical weight 57. The arm extension 54 carrying the longitudinally adjustable weight 57, counterbalances the unsprung weight represented by the wheel, stub axle, braking mechanism and the end of the arm which carries the wheel.

In Figure 7 we have shown elongated springs 58, 58 secured within the counterbalancing weight 57, or to it in any other suitable manner. These springs have rounded prong ends beyond the weight to engage the sides of the slot 55. By securing the weight 57 flexibly to the arm extension 54 by the springs 58, 58 or other suitable resilient means, the full effect of the inertia is not obtained immediately the wheel is subjected to the effect of a shock, because the resiliently-supported weight does not follow at once the lever arm about its pivot 48.

The counterbalancing weight softens the effects of the shocks to which the wheel is incident, when the inertia effect of the counterbalancing weight is less than its mass-times-gravity effect. When its inertia effect is greater than its mass-times-gravity effect, the resilient or other form of mounting employed substantially eliminates or softens the inertia effect of the counterbalance weight.

Having described our invention, we claim:

1. The combination with a vehicle frame, a road wheel, an arm secured at one end to said road wheel, a second arm, a king pin for pivotally securing one end of the second arm to said frame, elongated pivotal means for securing the free end of the first arm to the free end of the second arm, a shock strut between said arms, one end of said shock strut being pivotally secured to the free end of the second arm, and the other end of said shock strut being pivotally secured to the wheel end of the first arm.

2. The combination with a vehicle frame, a road wheel, an arm secured at one end to said road wheel, a second arm substantially parallel with the first arm, means for pivotally securing one end of the second arm to the frame, pivotal means for securing the free end of the first arm to the free end of the second arm, and resilient means secured between the free end of the second arm and the wheel end of the first arm.

3. The combination with a vehicle frame, a road wheel, an arm secured at one end to said road wheel, a second arm, means for pivotally securing the second arm to said frame, pivotal means for securing the free end of the first arm to the free end of the second arm, and forming with said arms three sides of a parallelogram, and yielding means secured between the free end of the second arm and the wheel end of the first arm.

4. The combination with a vehicle frame, a road wheel, an arm secured at one end to said road wheel, a second arm, means for pivotally securing the second arm to said frame, pivotal means for securing the free end of the first arm to the free end of the second arm, and forming with said arms, three sides of a parallelogram, and a shock strut connected at one end to the free end of the second arm and at its other end to the wheel end of the first arm, and projecting between the horizontal planes of both arms.

5. The combination with a vehicle frame, a road wheel, an arm secured at one end to said road wheel, a second arm, means for pivotally securing the second arm to said frame, pivotal means for securing the free end of the first arm to the free end of the second arm, and forming with said arms, three sides of a parallelogram, and a shock strut connected at one end to the free end of the second arm and at its other end to the wheel end of the first arm, at points to form a diagonal of said parallelogram.

6. The combination with a vehicle frame, a road wheel, an arm secured at one end to said road wheel, a second arm, means for pivotally securing one end of the second arm to the frame, pivotal means for securing the free end of the first arm to the free end of the second arm, and a shock strut between said arms, one end of said shock strut being pivotally secured to the free end of the second arm, and the other end of said shock strut being pivotally secured to the wheel end of the first arm.

THOMAS C. PEARSE.
THOMAS H. BONSER.